United States Patent [19]

Heindel

[11] Patent Number: 5,231,542
[45] Date of Patent: Jul. 27, 1993

[54] METHOD AND DEVICE FOR IMPROVING BASS RESPONSE IN MAGNETIC TAPE RECORDING

[76] Inventor: Alvin D. Heindel, 10115 52nd Ave., College Park, Md. 20740

[21] Appl. No.: 644,626

[22] Filed: Jan. 23, 1991

[51] Int. Cl.$^5$ ............................................. G11B 5/02
[52] U.S. Cl. ...................................... 360/29; 360/18; 360/28
[58] Field of Search .................... 360/29, 18, 20, 28, 360/30, 66, 27

[56] References Cited

U.S. PATENT DOCUMENTS

| | | | |
|---|---|---|---|
| 4,333,113 | 6/1982 | Kalinowski | 360/18 |
| 4,477,845 | 10/1984 | Mortlock et al. | 360/29 X |
| 4,542,424 | 9/1985 | Ishihara | 360/18 X |
| 4,654,607 | 3/1987 | Ishikawa | 360/29 X |

FOREIGN PATENT DOCUMENTS

| | | |
|---|---|---|
| 0213777 | 9/1984 | German Democratic Rep. |
| 0208610 | 12/1982 | Japan . |
| 1269185 | 11/1986 | U.S.S.R. . |

OTHER PUBLICATIONS

Miller, Gary M., Modern Electronic Communication, 1978, 1983 pp. 12, 13, 59, 60, 89, 90, 91.
Selsted et al., Magnetic Recording-State of the Art, Aug. 1954, Tele-Tech & Electronic Industries pp. 94, 95, 174, 175, 176, 177.
Jordan, B. D., Simple f.m. Mod/Demod. for a Magnetic Tape Recorder, Mar. 1974, Wireless World pp. 29, 30.
Davis, G. et al., The Sound Reinforcement Handbook 2nd edition Jun. 1990, p. 112.
DAK catalog Summer 1990 p. 62 DAK Industries Inc.
Pittman, R. A., The Tube Amp Book II p. 392 copywrite 1986 & 1988.

Primary Examiner—Robert J. Pascal
Assistant Examiner—Ali Neyzari

[57] ABSTRACT

The present invention relates to a method and device for recording the low frequency band of an audio signal on an amplitude modulated carrier above the highest frequency component of the audio signal. The carrier frequency is at least 19 kHz and is recorded at an adequate level above the noise floor typically about 10 to 30 dB below peak level. The audio signal with the low frequency band optionally attenuated or omitted is directly recorded in the normal audio region on the same track with the corresponding AM carrier. During playback the amplitude modulated carrier is recovered using a highpass or bandpass filter, demodulated and the low frequency signals mixed with the audio. When applied to audio tape reproduction, the present invention improves bass response as compared to direct recording alone. High quality low noise tape and narrow bandwidth of the AM signal allows audio reproduction with high signal to noise ratio. The invention is a further improvement over techniques using an FM carrier recorded in the ultrasound region. Unlike FM, the AM carrier is affected equally by wow and flutter as compared to the directly recorded audio, i.e. the frequency components are shifted in pitch by the same amounts allowing the low frequency components recorded on the AM carrier to stay "in tune" with the rest of the audio when subjected to the effects of wow and flutter. Less stringent requirements on wow and flutter in the tape transport mechanism and low cost of the AM system allow its use in home, portable and automobile tape equipment. To further improve the signal to noise ratio, the frequency components of the signal recorded onto the AM carrier can be companded.

5 Claims, 2 Drawing Sheets

METHOD AND DEVICE FOR IMPROVING BASS RESPONSE IN MAGNETIC TAPE RECORDING

BACKGROUND OF THE INVENTION

1. Field of the Invention

The present invention relates to a method and device for improving audio reproduction in magnetic tape recording particularly the bass response wherein the low frequency band of the audio signal is recorded on an AM carrier with the frequency of the carrier at least 19 kHz and recorded on the same track as the rest of the audio signal which is directly recorded onto the tape. During playback, the carrier is recovered using a highpass or bandpass filter, demodulated and the low frequency signals obtained are mixed with the directly recorded audio.

2. Description of the Prior Art

The method of using an ultrasonic carrier for recording information on audio tape with audio frequency information also directly recorded onto the same track is known in the art. U.S. Pat. No. 4,333,113 discloses a method of recording a coded digital signal on an FSK (frequency shift keying) high frequency (beyond 15 kHz) carrier for monitoring the reproduction of recorded information. Russian patent SU1269185 (November 1986) discloses a method of recording the low frequency component of an analog signal onto an FM carrier in the frequency range above the highest frequency component of the analog signal to reduce cross talk in multitrack recording. German patent DL 0213777 (September 1984) discloses a method wherein the frequency spectrum of an analog signal is inverted using a ring modulator and a 20 kHz carrier and recorded onto magnetic tape. The low frequency components of the analog signal are converted to frequency components just below 20 kHz and a 19 kHz component, for example, of the analog signal is converted to 1 kHz in the inverted signal. During playback, the carrier is regenerated and the signal is reinverted using a ring modulator to obtain the original signal. This process also is designed to reduce cross talk in multitrack recording.

The disadvantage with the Russian process is that recording analog signals onto an FM carrier requires very strict requirements on wow and flutter in the tape transport mechanism. This is especially true when recording narrow band FM. Wow and flutter is equivalent to FM as far as the carrier is converned. According to Selsted et al., using R.D.B. standards the usual deviation is 7½%. To get an accuracy of 1%, the speed variations of the recorder would have to be limited to about 0.1% peak-to-peak. Assuming the flutter is sinusoidal this would correspond to 0.035% of the usual rms flutter-measuring standard. This would require a high precision transport mechanism.

Specifications for wow and flutter of typical home cassette decks on the market can range from about 0.06% for very high quality cassette decks to about 0.15% for average cassette decks.

Another problem with the Russian process is that changes in tape speed can cause the low frequency components on the FM carrier and the directly recorded audio to be shifted in pitch by unequal amounts. If changes in tape speed occur at a rate comparable to the modulating frequencies in the FM signal this can cause phase shifting in the modulating frequencies. Since phase shifting or phase modulation is related to frequency modulation the modulating frequencies can themselves be frequency modulated by flutter. Much slower changes in tape speed (i.e. wow) produce an amplitude modulating effect on the modulating frequencies. These effects would tend to produce a kind of out of tune effect when FM and directly recorded audio were multiplexed onto the same tape track. A large enough deviation of the FM carrier (i.e. ±30%) could be used to reduce the error to an acceptable level but this would require a much greater bandwidth (i.e. ±30% deviation of a 19 kHz carrier would have a bandwidth of at about 11.4 kHz)

Disadvantages also exist with the German process. Inverting the audio requires that the whole audio range be processed (i.e. inverted) requiring low distortion processing to be comparable to direct recording. Another problem with inverted audio is that if changes in the frequency or amplitude of a high frequency component occurs faster than the period of the corresponding lower frequency component of the inverted audio signal distortion results. For example, a single wavelength of a 19 kHz signal (0.0526 ms period) could not be converted to a 1 kHz signal (1 ms period) without introducing distortion.

SUMMARY OF THE INVENTION

The present invention of multiplexing an AM carrier with directly recorded audio has several advantages over tghe prior art discussed above. Changes in tape speed, i.e. wow and flutter affect AM in essentially the same way as directly recorded audio. The frequency components of an AM carrier are shifted in exact relation to directly recorded signals allowing the low frequency signals recorded on the high frequency AM carrier to retain their harmonic relationship to the higher frequency components of the audio signal recorded directly thereby causing no out of tune effect compared to using an FM carrier. Since changes in tape speed change the pitch of AM frequency components to the same extent as compared to directly recorded signals, the same specifications for wow and flutter used in recording audio directly can be used for recording AM or multiplexed AM and direct signals. Tape transport mechanisms currently used for direct audio recording can be used for the invention disclosed here. This process could also be used in portable and automotive tape players which also tend to suffer from the added problem of being exposed to external vibration as well as wow and flutter generated by the tape transport mechanism itself.

The advantage of using an AM carrier as compared to using a supressed carrier SSB or DSB process as in the German patent discussed earlier is that there is no need for extra circuitry requiring high sensitivity for optimum results for generating the carrier.

Good performance is obtained if the AM carrier is recorded at about 10 to 20 dB below peak level. The narrow bandwidth AM signal (i.e. 200 Hz or less) does not contribute significantly to the noise level.

DESCRIPTION OF THE PREFERRED EMBODIMENT

Figure 1:
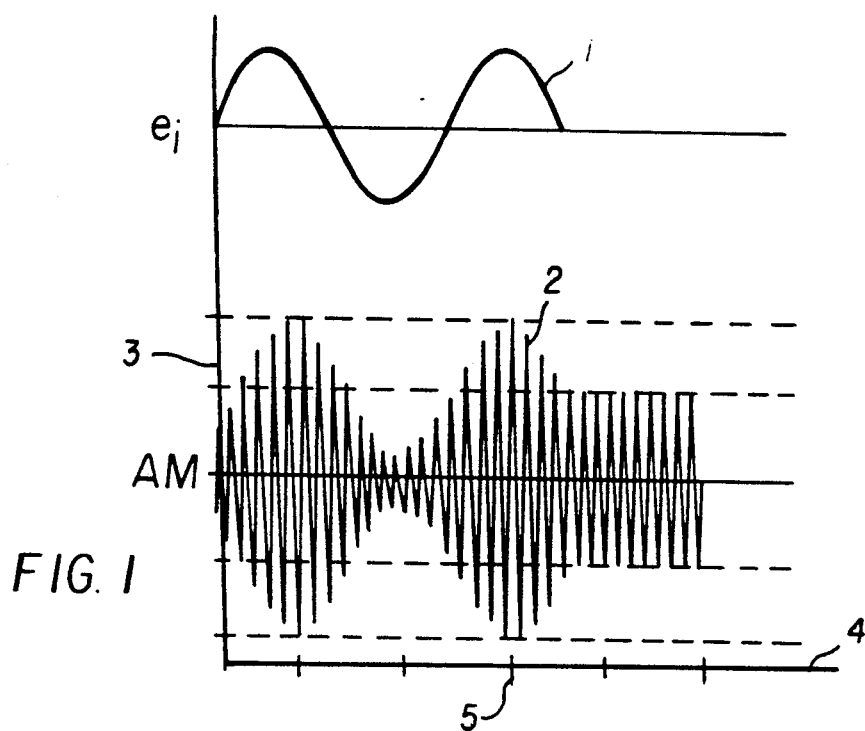
FIG. 1 shows a diagram of a low frequency sine wave and a higher frequency sine wave amplitude modulated with a sine wave of the sane frequency as the low frequency sinewave.

Referring to FIG. 1, to better show the relationship of AM and direct recording, a graphical representation of a low frequency sine wave, 1, is shown along with a carrier, 2, amplitude modulated with sine wave 1. The vertical axis, 3, is the relative amplitude and the horizontal axis, 4, is time. Marks, 5, are time intervals in a relative time frame.

As is known in the art, the envelope of the AM carrier varies exactly with the modulating signal. If the low frequency signal, 1, and the higher frequency AM carrier, 2, were recorded onto the same track of a magnetic tape and then played back using filters to recover the low frequency and carrier signals (separating the two signals into two channels) and the signals observed using a dual trace oscilloscope with the low frequency signal on the upper trace and the carrier on the lower trace, a trace like FIG. 1 can be obtained. If the tape were sped up or slowed down, it would be observed that the low frequency signal and the AM envelope expand or contract by the same amount as a result of the change in tape speed. In a magnetic recording of an audio signal, the amplitude of the audio signal is represented by the magnetic strength of the magnetic domains and time is represented by the length of the magnetic tape. In the experiment discussed above, the positive peak of sine wave 1 will always be at the same position on the tape as the maximum peak to peak value of carrier 2 and the negative peak of sine wave 1 will always be at the same position on the tape as the minimum peak to peak value of carrier 2. Therefore, changes in tape speed causes an equal change in frequency of sine wave 1 whether or not it is recorded directly or on an AM carrier. Thus the advantage of multiplexing directly recorded signals with an AM carrier, as discussed earlier, is that the signals recorded onto the AM carrier retain their harmonic relationship with the signals recorded directly and also high precision tape transport mechanisms are not required for recording AM as compared to FM.

Figure 2A:
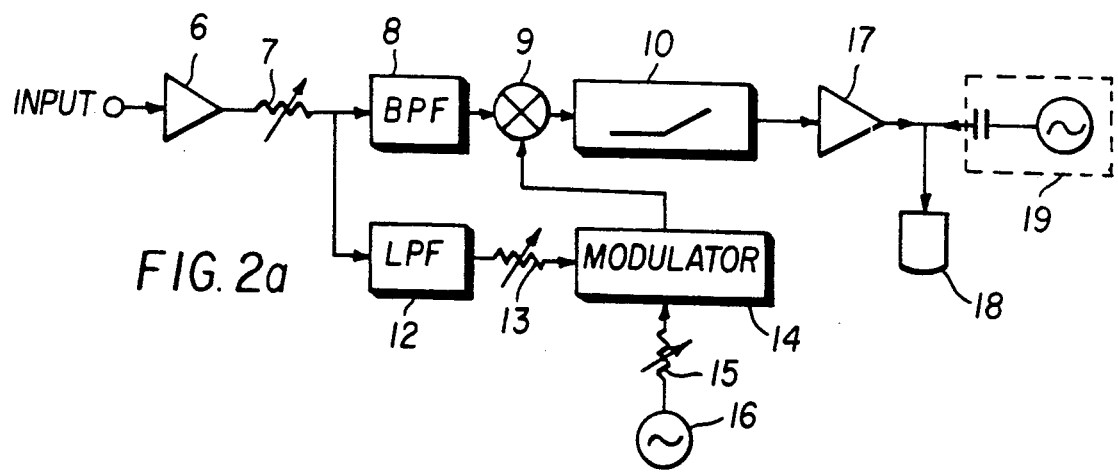
FIGS. 2a and 2b show two block diagrams representing two alternative embodiments of a recording circuit of the present invention incorporating the AM modulator circuit for recording the low frequency components of an audio signal on the high frequency carrier.
Figure 2B:
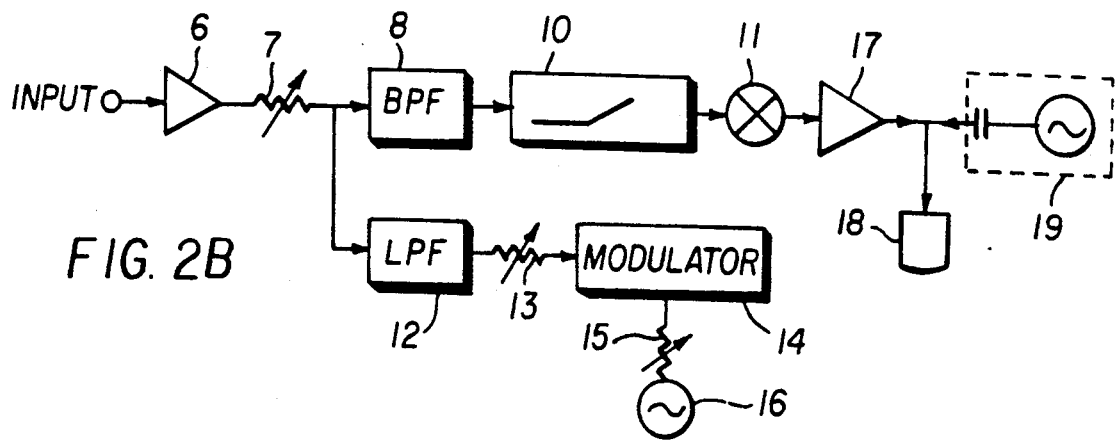

FIGS. 2a and 2b show two alternative block diagrams of a tape recording circuit of the present invention incorporating the AM modulator for recording the low frequency components of the audio signal onto an AM carrier.

Buffer amplifier 6 and level adjustment 7 is at the input. Signals to be directly recorded, for example, the band between 100 Hz and 15 kHz, are passed through the 100 Hz-15 kHz band pass filter 8, preemphasized at 10, amplified by the recording head driver amplifier 17, combined with the bias signal from bias generator 19 and recorded onto magnetic tape by tape head 18. Low frequency signals to be recorded onto the AM carrier, for example, the band between 0 and 100 Hz are passed through low pass filter 12 having a high frequency cutoff point at the high end of the low frequency band. A high frequency carrier, for example 19.5 kHz, generated by oscillator 16 is amplitude modulated by the low frequency signals in modulator 14 and mixed with the signals to be directly recorded either at 9 before preemphasis or at 11 after preemphasis and recorded along with the directly recorded signals onto tape. Low frequency level adjustment 13 and carrier level adjustment 15 are preferably provided to provide signal level adjustment for optimizing signal to noise ratio and distortion. A bias level adjustment (not shown) allowing the user to set the bias level can also be included as is done on some tape recorders on the market. The low frequency range of the directly recorded band can be optionally attenuated or omitted as is done in the circuit in FIGS. 2a and 2b. This would allow the higher frequency components including the AM carrier to be recorded at a higher level for improved signal to noise ratio. Alternatively, to keep the tape recording compatable with tape players which do not have this system, the low frequency range can be directly recorded at a normal level. Obviously, this can be done by either changing the filter charactoristic of band pass filter 8 or including an adjustment in band pass filter 8 either variable or switchable between two levels, for example. A cross over frequency other than 100 Hz can also be used. Incorporating frequency adjustment into band pass filter 8 (low end) and low pass filter 12 would allow adjustment of the cross over frequency. A low cross over frequency, for example about 30 to 40 Hz, would be desirable if maximum compatability between tape players without this system were desired. In this case the entire audio frequency band is directly recorded at a normal level with no attenuation of the low frequencies. On the other hand, if it was desired to use the tape recording on tape players of the present invention exclusively, using a higher cross over frequency, for example 70 to 100 Hz, while omitting the low frequency band in the directly recorded signals would allow recording the higher frequency components at a higher level as discussed earlier.

Figure 3A:
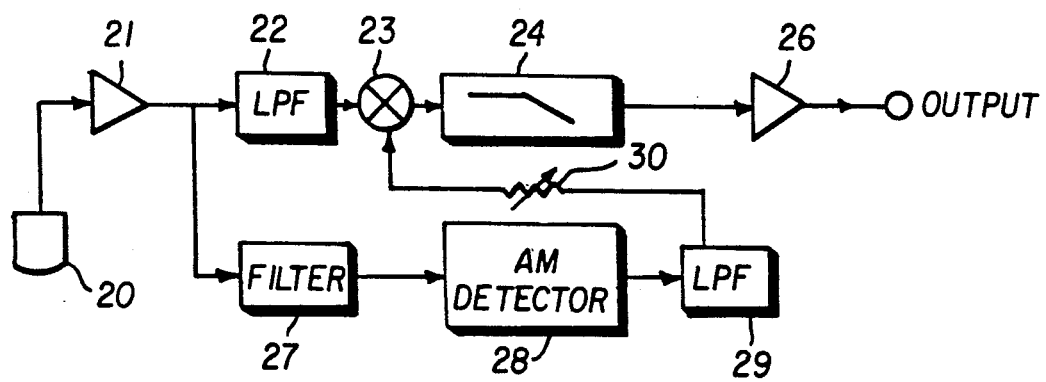
FIGS. 3a and 3b show two block diagrams representing two alternative embodiments of a playback circuit of the present invention incorporating an AM demodulator circuit for demodulating the high frequency carrier to obtain the low frequency signals which are then added back to the higher frequency components of the audio signal.
Figure 3B:
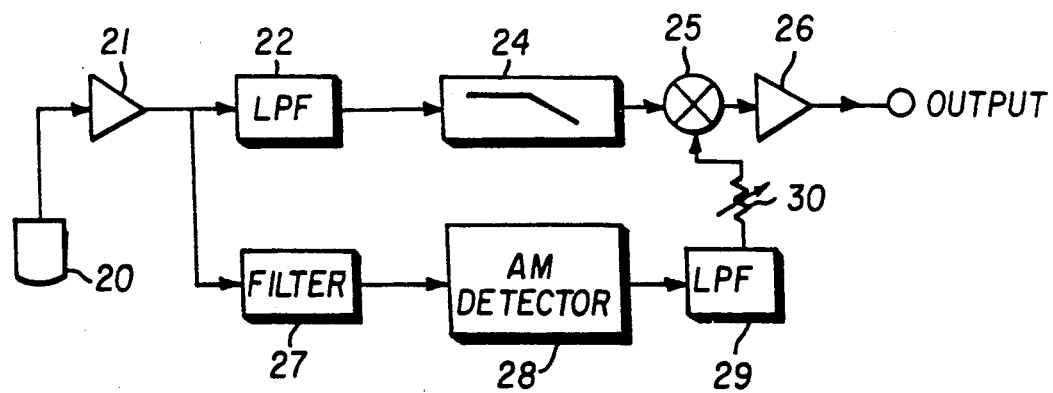

FIGS. 3a and 3b show two alternative block diagrams of a tape playback circuit of the present invention incorporating an AM demodulator for recovering the low frequency signals recorded on the AM carrier.

Signals from playback head 20 are amplified by preamplifier 21. Directly recorded signals pass through low pass filter 22 having a cutoff frequency above the highest frequency component of the directly recorded signal, for example 15 kHz, are deemphasized in 24 and pass through amplifier 26 to the output. The AM carrier is recovered using bandpass or highpass filter 27 having the required filter characteristics to recover the AM carrier while rejecting undesired frequency components from the playback preamplifier. The AM carrier is demodulated by demodulator 28 to obtain the low frequency signals recorded on the AM carrier. The low frequency signals pass through low pass filter 29 which has a cutoff frequency just above the highest frequency component of the low frequency band and are mixed with the directly recorded audio band in a mixer placed at either 23 before deemphasis or at 25 after deemphasis. Level adjustment 30 for the low frequency band is preferably provided. Using low pass filter 29 allows the use of a bandpass or highpass filter at 27 having a frequency response which allows a relatively wide range of frequencies to pass through making the carrier frequency less critical. The use of a 19.5 kHz carrier frequency was suggested earlier because it is believed that it would be advantagious when recording an FM stereo broadcast. It is known that residual levels of the 19 kHz pilot subcarrier can occur at the output of an FM stereo receiver. There have been a number of FM receivers on the market that have circuitry designed to cancel out the residual 19 kHz signal, although, it may be found that many less expensive receivers may have some residual level of the 19 kHz signal. This would tend to produce a 500 Hz beat frequency when mixed with the AM carrier in the demodulator 28. This problem can be eliminated by having appropriate frequency response of bandpass filter 8 in FIGS. 2a and 2b (i.e. high cutoff frequency of 15 kHz) and low pass filter 29 in FIGS. 3a and 3b (i.e. cutoff frequency of 100 Hz or less). In a standard FM stereo broadcast signal there are no frequency components between the 19 kHz pilot and the low end of the DSB suppressed carrier at 23 kHz. An AM carrier between 19.5 kHz and 22.5 kHz, for example, would be free from any possible interference from any FM stereo frequency components that may be present.

It is obvious that certain modifications can be made to the circuits shown in FIGS. 2a, 2b, 3a and 3b while remaining within the scope of the present invention, for example, separate preamplifiers can be used in the input stages of both circuits for each frequency band (instead of 6 and 21 in FIGS. 2a, 2b, 3a and 3b respectively). The carrier frequency can also be generated by dividing the bias signal by an appropriate amount (i.e. 97.5 kHz bias signal divided by 5 equals 19.5 kHz for the AM carrier) as is disclosed in German patent DL 0213777 discussed earlier. Alternatively, the generation of the modulated AM carrier could be done before the tape recording circuit instead of incorporating an AM modulator in the recording circuit and the AM demodulation and mixing process on playback could be done after the playback circuit. This would allow a separate "outboard" system of the present invention to be used with a tape recorder which has the required bandwidth to record the high frequency carrier.

To improve the signal to noise ratio, the low frequency band recorded onto the AM carrier can be companded.

This can be accomplished by inserting a compressor (not shown) after low pass filter 12 in FIGS. 2a and 2b and an expander (not shown) after low pass filter 29 in FIGS. 3a and 3b. Compansion of about 2:1 to 3:1 with an attack time of about 5 ms and recovery time of about 200 ms should be adequate.

The system of the present invention can also be used in conjunction with present tape noise reduction techniques such as Dolby A, B, C or SR or dbx type I or II for example. Since these noise reduction techniques were designed for use with audio signals (i.e. without carriers present) it may be preferable to encode and decode the audio using the noise reduction technique without the carrier being present, i.e. adding the carrier after encoding when recording and recovering the carrier and filtering out the carrier from the encoded audio before decoding during playback. Such processes would be obvious to those skilled in the art.

EXAMPLE 1

During the decade of the 1980's, there has appeared on the market a number of high quality recording tapes from various manufacturers. The newer formulations result in tapes having a very low noise level and higher maximum operating level (MOL) allowing high quality audio reproduction. In spite of these improvements these tapes still tend to be somewhat lacking in bass response when compared to LP records and compact disks. This effect can be readily observed if sound effects having a relatively high level of bass frequency components are recorded onto cassette tape from an LP record or compact disk. When comparing the tape to the LP record or compact disk (observed by those with normal hearing), the taped sound effects tend to lose some of the impact when compared to the original recording because of the lack of deep bass response. Reel to reel tape operated at slower speeds also tends to lack bass response somewhat. For example, 4 track quarter inch reel to reel tape operated at about 1⅞ to 3¾ inches per second seems to have better bass response compared to cassette tape but does appear to lack bass response compared to higher speed tape, good quality LP records and compact disks.

A series of experiments were performed to test the feasibility of the present invention. A 19.5 kHz sine wave was recorded onto Denon brand HD-M type IV metal cassette tape at about 10 dB below peak level (compared to the peak voltage level of a 1 kHz sine wave) on a JVC KD-V50 cassette recorder. On playback, the signal was passed through a 16 kHz high pass filter and the noise level was measured using a dual trace oscilloscope according to the following technique. The signal is injected into both channels set at the same sensitivity and sweep time. The vertical positions of the traces are then adjusted until the dark band between them just disappears. The signals are removed and the distance between the traces represents twice the noise voltage. It was found that the noise voltage was at least 45 to 50 db below the signal voltage level. The same test was performed with Maxell XLI (for mastering use) 4 track reel to reel tape on an Akai 1730D-SS reel to reel tape recorder (at a speed of 7½ and 3¾ inches per seconds) with similar results. Using a bandpass filter with a narrow bandpass characteristic or an AM detector and 100 Hz low pass filter in the experiment as well as electronics with a better noise figure should give better results. The cassette and reel to reel tape recorders used in the experiment are not "high end" audio components but represent tape recorders of modest cost.

The same cassette and reel to reel tapes (7½ and 3¾ inches per second for the reel to reel tape) were recorded according to the present invention using an AM modulator built around a CA3080 operational transconductance amplifier. An audio signal generator was used to supply the carrier. A good quality ten band stereo graphic equalizer and a 16 kHz low pass filter (simple three stage RC network) for the directly recorded audio was used to separate the audio into two bands, a low bass band and a band containing upper bass, midrange and treble frequencies to be recorded monophonically according to the present invention. A cross over point of about 62 Hz was used. The 31 Hz slide control was set to −12 dB and the 62 Hz slide control was set to −6 dB in the higher frequency equalizer channel and the 31 Hz and 62 Hz controls were each set to +12 dB while the higher frequency controls were all set to −12 dB for the low bass band. The low bass band was used to modulate the carrier in the AM modulator and mixed with the higher frequency band in a mixer built around a TL071 operational amplifier to be recorded onto tape. After testing the circuit by recording tapes with signals from an audio signal generator, selections from various LP records and compact disks were recorded onto tape (monophonically) using the present invention. On playback, the AM carrier was recovered using a 16 kHz high pass filter, amplifier and then demodulated with a transistor detector, filtered using a 100 Hz low pass filter and mixed with the higher frequency band which had been directly recorded and listened to through a home stereo system. On listening to the tape, it was apparent that the recording had a somewhat more extended and clearer bass response compared to a tape recorded without this system. Although, the bass didn't appear to be as clear or sharply defined when compared to an LP record or compact disk, it was judged that this system gave a significant improvement in sound quality especially for cassette tape.

No "out of tune" effect as that described was observed in the experiment even when the rubber roller and capstan were slowed down by hand on the reel to reel tape recorder.

A further improvement could be obtained by using a synchronous AM detector since this type of detector has low distortion (under 1%) and a greater ability to follow fast-modulation waveforms and can be used in high fidelity applications. An RCA CA3067 or National Semiconductor LM3067 chroma demodulator can be easily adapted for use as a synchronous AM detector according to the method given by Miller. This circuit can be used with carrier frequencies as low as 10 kHz.

The above example is not meant to limit the scope of the present invention. Numerous modifications or alterations may be made therein without departing from the spirit and scope of the invention as set forth in the appended claims.

I claim:

1. A method for improving the bass response in audio magnetic tape reproduction, comprising the steps of amplitude modulating a high frequency carrier with a low frequency band of an audio signal, wherein the frequency of said carrier is between 17.5 KHz and 22.5 KHz and said low frequency band is in the range between 0 Hz and 100 Hz, the frequency of said carrier is higher than the highest frequency component of said audio signal and both said amplitude modulated carrier and said audio signal are simultaniously recorded onto the same magnetic tape track; during the process of play-back, said amplitude modulated carrier is recovered using a high pass or band pass filter of appropriate frequency charactoristics to recover said amplitude modulated carrier, said amplitude modulated carrier is demodulated to recover said low frequency band, said low frequency band is passed through a low pass filter having a cutoff frequency just above the highest frequency component of said low frequency band and said low frequency band is mixed with said audio signal recovered from the same track during play-back.

2. The method of claim 1, wherein the AM carrier is recorded onto said magnetic tape at a level between 10 dB and 20 dB below peak level.

3. The method of claim 1, wherein said low frequency band is companded, the ratio of said compansion is between 1:2 and 1:3.

4. The method of claim 1, wherein said magnetic tape is standard ⅛ inch cassette tape.

5. The method of claim 1, wherein said magnetic tape is reel to reel tape, the speed of said reel to reel tape during recording and playback is 7½ inches per second or less.

* * * * *